United States Patent Office 3,082,173
Patented Mar. 19, 1963

3,082,173
COAGULATING AID AND METHOD OF TREATING WATER THEREWITH
Howard J. Horvitz, 21800 Shaker Blvd., Cleveland, Ohio
No Drawing. Filed Aug. 4, 1958, Ser. No. 753,081
5 Claims. (Cl. 252—181)

This invention, relating as indicated to a coagulant aid, is particularly directed to a stable liquid product comprising a hydrophilic colloid, such as some of the natural occurring gums or a starch colloid, together with sodium or potassium aluminate or mixtures thereof. This liquid product must be formed with materials which are water dispersible, preferably the cold water dispersible starches, such as the acid hydrolyzed starches or equivalent materials. These materials would be used to assist the floc clarifying action, settling speed and the like with coagulants, such as alum or ferric sulfate.

This invention further relates to the addition of a coagulant aid comprising sodium aluminate and acid hydrolyzed starches, such as Amidex 411, 511 or 611, White dextrin, Canary dextrin and British gum, to the normal alum treatment of turbid waters, which improves the floc clarifying action of the alum, produces more stable flocs faster and results in comparable clarification with less alum than previously considered necessary. The soluble starches of the class mentioned, modified by acid treatment, were the best suited, giving stable solutions of moderate concentration in the presence of a high concentration of sodium aluminate.

A few examples of these stable solutions for use as coagulant aids follows:

| NaAlO₂, percent | NaOH percent | Amidex | | | Dextrin | | British gums, percent |
|---|---|---|---|---|---|---|---|
| | | 411, percent | 511, percent | 611, percent | White, percent | Canary, percent | |
| 27 | 13 | 3 | 3 | 3 | | | |
| 20 | 10 | 13 | 13 | 13 | 7 | 7 | 3.7 |
| 11.6 | 5.5 | -- | -- | 14 | 17 | | |

This invention is further directed to a coagulant aid which may be handled in liquid form, comprising a combination of sodium aluminate, potassium aluminate or mixtures thereof, together with a water dispersible starch, such as the acid hydrolyzed or possibly the enzyme hydrolyzed water dispersible starches, in a proportion of ingredients approximately about 25 to 50 percent of the liquid by weight and used in a quantity about .1 p.p.m. by weight. This is added to water in need of clarifying, and its useage substantially reduces the amount of alum required to clarify the water. Under certain conditions additional hydrophilic colloids may be used, and these involve the water soluble, natural gums, such as:

Arabic                Mesquite
Ghatti                Angico
Shiraz                Talha Extracts from seeds:

Locust                Quince
Guar                  Psyllium

Extracts from seaweeds:

Agar                  Alginate
Kelp                  Irish Moss

Additional colloids, such as animal colloids, latices, pectin or the like, may also be used.

The particular emphasis in this composition is to a stable combination of a flocculating agent and a cold water dispersible material, particularly starch. These materials must be readily dispersible in water and not coagulate or become otherwise unusable when fed into cold water under normal operating conditions.

The particular advantage of these coagulant aids when used in combination with a coagulant is that small amounts of a coagulant aid allow a large reduction in the basic or principal coagulant, while providing a substantial reduction in the turbidity of the water. In the alternative, it may be desirable to use an equivalent amount of coagulant with the coagulant aid to effect a more substantial reduction in the turbidity of the water. A further advantage of this particular coagulant and coagulant aid is that it allows for a more rapid and more complete settling of the floc, and this prevents a large passover of the floc into the filter beds and allows longer filter runs before backwash.

It is, of course, to be understood that this particular coagulant aid, a combination of sodium aluminate, potassium aluminate and mixtures thereof, together with starch, may be used with acid coagulants such as alum, or with equivalent materials such as aluminum ammonium sulfate, aluminum chloride solutions, aluminum potassium sulfate, chlorinated copperas, as well as with ferric sulfate, ferrous sulfate and ferric chloride.

An object of this invention is to produce a new and improved coagulant aid, adaptable for use with coagulants, comprising a mixture of a hydrophilic colloid, together with sodium aluminate or potassium aluminate.

A further object of this invention is to provide a coagulant aid which has a coagulating action in and of itself but is particularly an aid to alum coagulation, with said aid incorporating hydrophilic colloids and including the natural gum hydrophilic colloids, as well as other colloids, such as the acid hydrolyzed starches, White dextrin, Canary dextrin and British gum, and particularly the acid hydrolyzed starches, such as Amidex, together with sodium aluminate or equivalent materials.

A further object of this invention is to provide a new process for the treatment of water, which comprises incorporating a hydrophilic colloid and an aluminate of the group consisting of sodium, potassium or mixtures thereof, and treating the water with said materials, together with alum, the principal coagulant, but using substantially reduced quantities of alum, and using said coagulant aid in the proportion of about .1 p.p.m. by weight and ranging between 10 p.p.m. and .001 p.p.m. by weight of the materials.

This invention then is particularly directed to a stable combination that may be used in connection with non-toxic materials, i.e., waters which must be treated, since rigid health standards must be met, and it is to be understood that there is no probable conflict with the health regulations in the use of the coagulant aids of this invention.

I have employed the use of a Glossary herein in order to more clearly explain the invention and its components.

GLOSSARY

*Amidex.*—trade designation for B411, B511 and B611 starch products (Corn Products Sales So.) made by acid hydrolysis of corn starch followed by neutralization, filtration and drying.

*Amidex, B511.*—a modified roll dried, partially pregelatinized starch (Corn Products Sales Co.)

*Arojet M.*—trade designation for a cold water swelling starch in precooked or pregelatinized form (Morningstar-Paisley, Inc.), useful for selective flotation and settling, particularly of ore concentrates. Arojel M has greater viscosity caused by the linking of the amylose and amylopectin fractions of the starches in the presence of water, forming a spongelike formation which holds greater amounts of water by molecular attraction in addition to the free water which is continuous throughout the gel network and a necessary part of its colloidal physical properties. These starches form micelles, i.e., multi-molecular aggregates, and they have the properties of precipitating upon solid surfaces forming either definite compounds with some ingredient or static neutralization complexes, or floccules, between charged ionized solid surfaces and ionized groups at their own surfaces. When the amount of starch is small, the coating is usually selective and dispersion can be effected. At the isoelectric point (i.e., the point of electric neutrality or zero potential), the coating particles flocculate. Large amounts of starch coat all ore particles and usually produce flocculation.

*British Gum.*—a type of dextrin, a carbohydrate produced by hydrolysis of starch—the intermediate product between starch and sugar. There are variations in roasting time and temperature, and the use of small amounts of acid in the roasting process for certain gums, account for the differences in the various types. British gums vary in color from light to dark brown; some of the slightly converted types are almost as thick-cooking as regular starch. The more highly converted types are almost as thin-boiling as the canary or yellow dextrins. British gums are more stable than the thin-boiling starches, and have good "film" properties, meaning the spreading ability or gummy characteristic usually associated with adhesive coatings. They approach the oxidized starches in this respect.

*Dextrins, Canary or Yellow and White.*—a carbohydrate produced from starch by hydrolysis by dilute acids, diastase, ferments, or dry heat. It is an intermediate product between starch and the sugars into which starch hydrolyzes. It is colloidal in properties and describes a class of substances, hence has no definite formula. White dextrins, like British gums, are roasted but at much lower temperatures and in the presence of acid. Unlike British gums, white dextrins are light-colored and pasty; their cooked and cooled solutions set to soft pastes rather than firm gels. In contrast to oxidized starches, white dextrins are unstable, less fluid, less filmy and more pasty. A heavy white dextrin (of lower conversion and higher viscosity) forms a solution of about the same viscosity as a high fluidity thin-boiling starch and resembles it in other ways. Yellow dextrins or canary dextrins are made by roasting starch with less acid and more heat than white dextrins require, and with more acid and less heat than are used in making British gums. They are the most highly converted of all the treated starches. All yellow dextrins are relatively thin-boiling. It is possible to make concentrated 50 to 60 percent solutions of yellow dextrins that will remain stable for months. These solutions are very tacky, or sticky. The unusual tackiness and fast-drying properties of concentrated high-solids yellow-dextrin solutions indicate why yellow dextrins are used mainly for adhesives.

*Dextrorotary.*—a substance whose solution turns the plane of polarized light to the right, i.e., clockwise.

*Carbohydrate.*—a chemical compound composed of carbon, hydrogen and oxygen (starch, sugar and cellulose are three of the most common types).

*Enzyme.*—any of a class of complex organic substances that accelerate (catalyze) specific transformations of material, as in the conversion of starch.

*Gel.*—a firm, semirigid-textured, cooled starch-paste resembling a jelly, or, to form a gel.

*Gelatinize.*—to cook starch in aqueous suspension to the point where swelling of the granules takes place, forming a viscous solution.

*Guar Gum or Guar Seed Gum.*—a polysaccharide consisting of complex carbohydrate polymers of galactose and mannose, i.e., the galactomannan. It is a free flowing whitish powder. A guar molecule has an average molecular weight of 220,000. It is a straight chain mannan. The mannose units are linked in a 1–4 beta-glucosidic linkage and the galactose braching takes place by means of a 1–6 linkage and occurs on alternate mannose units.

*Hydrolysis.*—a process of splitting a molecule into smaller parts by chemical reaction with water.

*Hydrophilic colloid.*—finely divided particles which form a stable suspension in water (hydrophilic-water loving).

*Hydroxyl (OH) group.*—a chemically combined grouping or "radical" consisting of one oxygen atom and one of hydrogen.

*Micelles.*—the tight bundles into which linear starch molecules and the linear segments of the branched molecules are drawn together.

*pH.*—a measure of the acidity or alkalinity of a solution, pH 7 being neutral, lower values acid and high values alkaline.

*Polyelectrolytes.*—high molecular weight electrolytes of either natural origin or synthetic origin, examples of natural origin being proteins and polysaccharides. These polyelectrolytes may be either weak or strong electrolytes. Polyelectrolytes in solution do not dissociate to give a uniform distribution for positive and negative ions as simple electrolytes. The ions of one side are bound to polymer chains, thus, for instance, the positive charge may be in the polymer chain and the only negative ion may be free to diffuse through the solvent.

*Polymer.*—a large, complex molecule—an aggregate of molecular units bound together.

*Retrogradation.*—the reverse of gelatinization and hence dehydration and reversion of cooked starch from a paste to a condition of insolubility.

*Starches:*

*B918.*—a highly cross-linked white milo (waxy milo). This starch has terrific heat stability. It also has great ability against freeze and thaw. It is more resistant to acid and alkali as compared to other starches (Corn Products Sales Co.)

*4828.*—a non-pregelatinized version of B918 starch, i.e., it is a highly cross-linked white milo (waxy milo) (Corn Products Sales Co.)

*Buffalo 3401.*—plain corn starch unmodified, but separated from the other ingredients, such as protein, oil and fiber (Corn Products Sales Co.)

*Snow Flake B761.*—a starch made from milo starch. It is spray dried and pregelatinized. It is excellent for use in milk products. It will not stand low pH's. The preferred pH for this product is around 4 to 5, and it should be used with a buffered salt.

---

1 grain = 1/7000 pound
1 p.p.m. = 1 milligram per liter = .001 gr./liter .0001 cc./liter = 1/10 part/million = 1/10 p.p.m.
1 grain per gallon = 17.14 p.p.m.

PREPARATION OF SOLUTION

Generally in connection with this invention procedures were standardized. A strong solution of sodium aluminate was used with various combinations of hydrophilic colloids, particularly starches. One example of how this composition was prepared follows:

26 parts by weight of sodium hydroxide were dissolved in 87 parts by weight of water; 26 parts of Al(OH)$_3$ or Al$_2$O$_3$·3H$_2$O were then added slowly with stirring and the mixture heated until the solution was clear.

This solution contained about 20 percent sodium aluminate with an excess quantity of about 10 percent sodium hydroxide, based on the weight of the entire solution. The range of excess sodium hydroxide which may be used may be as low as 6 percent or as high as 50 percent, more or less, of the aluminate by weight. With less than 6 percent sodium hydroxide excess, the stability of the solution is adversely affected.

The starch or other hydrophilic colloid was then added to the sodium aluminate solution, cold and hot, sometimes with slow speed stirring, at other times high speed stirring without any noticeable effect. Generally speaking it was found that flocculation improved as the percentage of starch in the solution increased. The addition of starch to the coagulant solution was limited by the viscosity of the resulting solution and the impracticality of feeding a highly viscous solution into water. As the size of the starch molecule decreased, the flocculation characteristics of the solution improved. This tendency continued until the starch was broken down into sugars. It was both possible and desirable to place larger amounts of starch in solution and maintain a suitable viscosity by utilizing the smaller size molecules. The dextrin and gum solutions, such as British Gum, were easier to use because higher concentrations could be obtained without increasing the viscosity. These were added in by stirring them in with water first and then adding the mixture to a warm sodium aluminate solution. With improved stirring, it would probably not be necessary to warm the solution when adding the starch though in connection with this preparation that technique was used. It is possible to obtain a solution containing about 30 percent sodium aluminate by weight. An excess of about 10 percent or more of sodium hydroxide by weight is present, and this solution may be prepared in the following manner:

Heat 26 grams of sodium hydroxide in water and add 26 grams $Al_2O_3 \cdot 3H_2O$, the total weight of solution being kept at 100 grams (75 ml.).

On occasions, this solution is diluted, 1 to 1 or 1 to 2; 1 to 4 or even 1 to 8, in order to provide lower concentration of sodium aluminate with other starch solutions.

Guar Gums

Concentrated solutions of Guar Gums that would remain stable over long periods of time could not be prepared. Such solutions were made up when they could be used almost immediately after preparation. They were used by mixing the guar and aluminate and then adding this to the water with a separate stream of alum solutions. The guars were Jaguar and Guartec, and these were stirred cold with concentrated hydrochloric acid for 30 minutes diluted with water and neutralized and alkalinized with sodium hydroxide. The alkaline solution was added to the sodium aluminate solution. Jaguar or Guartec in the amount of 1 to 3 grams was taken; 10 ml. concentrated HCl added, stirred manually for 30 minutes; 35 ml. of distilled $H_2O$ added, mixed for 10 minutes; and then 5 grams of NaOH added, stirred for five minutes.

Flocculation Tests

In connection with these studies, various tests of stability were made as well as various flocculation tests. The flocculation tests were prepared in the following manner:

The standard procedure for flocculation tests with alum was followed, and a measured volume of a solution of alum was added to one liter of turbid water. The materials were rapidly stirred for about one minute and then stirred at a slow speed for 15 minutes. After the stirring was stopped, the contents were allowed to settle. The time of first formation and the rate of settling of the floc was noted, as well as the speed of settling after the settled floc was again stirred up. This is an indication of the hardness of the floc. The subsequent clarity of the water was also noted. In these tests comparisons were made between alum alone and alum with various coagulant aids in adjacent containers.

Stability of Sodium Aluminate-Starch Solution

Mixtures of sodium aluminate solution and starch were allowed to stand for several weeks. Insoluble material separated at once or in 24 hours from many of the mixtures. From some, standing for several days, no sediment was obtained. These solutions were centrifuged and from some of them considerable sediment was obtained. These latter solutions were considered to be unstable. These unstable solutions upon long standing were found to have considerable quantities of sediment, verifying the fact that the solutions were unstable.

In some, especially the dilute sodium aluminate-dextrin solutions, some slight sediment was observed, probably impurities, but after this initial sediment was filtered off, the filtrate remained clear. These solutions were considered stable. The sediment filtered off was probably impurities in the sodium hydroxide and the insoluble portion of the colloid.

The fluidity of the solution was tested by the ability of the solutions to flow readily from a pipette. The stability to warm storage was tested by placing solutions in hot air ovens at 35 to 40° C. At this temperature the stable solutions remained.

The following stability tables should be noted in connection with this invention:

TABLE I

Amidex 411; $NaAlO_2$, 20%; Spec. gravity, 1.30–1.35

| Expt. | Percent Amidex 411 | Mixing | Stability | | |
|---|---|---|---|---|---|
| | | | 24 hours | 2 weeks | 4 weeks |
| 1 | .9 | Blender, 3 min | Fluid | Fluid | Fluid. |
| 2 | 3.7 | ----do---- | ----do---- | ----do---- | Do. |
| 3 | 7.1 | ----do---- | ----do---- | ----do---- | Do. |
| 4 | 13.0 | ----do---- | Very viscous | Very viscous | Very viscous. |
| 5 | 2.2 | Manual stir, 5 min | Fluid | Fluid | Fluid. |
| 6 | 2.2 | Blender, 3 min | ----do---- | ----do---- | Do. |
| 7 | 2.2 | 60° C., 1 min | Fluid (yellow) | ----do---- | Do. |
| 8 | 2.2 | 100° C., 1 min | ----do---- | ----do---- | Do. |
| 9 | 4 | Boil, 3 min | Viscous | Viscous | Viscous. |
| 10 | 8 | ----do---- | ----do---- | ----do---- | Do. |
| 11 | 13 | Blender, 5 min | ----do---- | ----do---- | Do. |

NOTE.—Experiments 5, 6, 7, and 8 were run as a group to determine the effects of temperature of mixing on the resulting solution. The sodium aluminate was prepared by heating 26 parts of $Al_2O_3 \cdot 3H_2O$, 26 parts of NaOH, and 87 parts of water until the solution was clear. To 100 cc. of this solution were added Amidex 411 to bring to the reported concentration of this material.

TABLE II
Amidex 511; NaAlO₂, 20%; Spec. Gravity, 1.30–1.35

| Expt. | Percent Amidex 511 | Mixing | Stability | | |
|---|---|---|---|---|---|
| | | | 24 hours | 2 weeks | 4 weeks |
| 1 | 2.2 | Blender, 5 min | Liquid | Liquid | Liquid. |
| 2 | 2.2 | Manual stir | ___do___ | ___do___ | Do. |
| 3 | 2.2 | Manual stir 60° | Liq. (sl. yellow) | ___do___ | Do. |
| 4 | 2.2 | Manual stir 100° | ___do___ | ___do___ | Do. |
| 5 | 3.7 | Blender, 3 min | Liquid | ___do___ | Slight ppt.? |
| 6 | 3.7 | Blender, 3 min 70° | ___do___ | ___do___ | Do. |
| 7 | 3.7 | Blender, 3 min 90° | ___do___ | ___do___ | Liquid. |
| 8 | 4.7 | Blender, 3 min 60° | ___do___ | ___do___ | Slight ppt.? |
| 9 | 5.5 | Blender, 3 min | ___do___ | ___do___ | Liquid. |
| 10 | 7.1 | ___do___ | ___do___ | ___do___ | Do. |

NOTE.—The slight precipitates in 5 and 8 after one month are not considered seriously indicative of instability of the emulsion.

TABLE III
Amidex 611; NaAlO₂, 20%

| Expt. | Percent Amidex 611 | Mixing | Stability | | |
|---|---|---|---|---|---|
| | | | 20 hours | 2 weeks | 4 weeks |
| 1 | 1.5 | Manual stirring | Liquid | Liquid | Liquid. |
| 2 | 2.2 | Blender, 3 min | ___do___ | ___do___ | Do. |
| 3 | 2.2 | Manual 60°, 1 min | Slightly viscous | Viscous | Viscous. |
| 4 | 2.2 | Manual 100°, 1 min | ___do___ | ___do___ | Do. |
| 5 | 3.7 | Blender, 3 min | Liquid | Liquid | Liquid. |
| 6 | 7.1 | ___do___ | ___do___ | Slightly viscous | Slightly viscous. |
| 7 | 13 | ___do___ | Viscous | Viscous | Viscous. |
| 8 | 16 | ___do___ | Solid | Solid | Solid. |

TABLE IV
White dextrin 7062; NaAlO₂, 20%

| Expt. | Percent white dextrin | Mixing | Stability | | |
|---|---|---|---|---|---|
| | | | 20 hours | 2 weeks | 4 weeks |
| 1 | 2.2 | Blender, 5 min | Liquid | Liquid | Liquid. |
| 2 | 2.2 | Manual 60°, 5 min | ___do___ | ___do___ | Do. |
| 3 | 2.2 | Manual 100°, 5 min | ___do___ | ___do___ | Do. |
| 4 | 2.2 | Manual, 5 min | ___do___ | ___do___ | Do. |
| 5 | 3.7 | Blender, 5 min | ___do___ | ___do___ | Do. |
| 6 | 7.1 | ___do___ | ___do___ | ___do___ | Do. |
| 7 | 33 (dist H₂O) | Manual, 5 min | ___do___ | ___do___ | Do. |
| 8 | 33 (tap H₂O) | ___do___ | ___do___ | ___do___ | Do. |
| 9 | 42 (tap H₂O) | ___do___ | ___do___ | ___do___ | Do. |

TABLE V
White dextrin 7062; NaAlO₂, 11.6%

| Expt. | Percent white dextrin | Mixing | Stability | | |
|---|---|---|---|---|---|
| | | | 20 hours | 2 weeks | 4 weeks |
| 1 | 14 | Blender, 5 min | Liquid | Liquid | Liquid. |
| 2 | 17 | ___do___ | Viscous | Viscous | Viscous. |

TABLE VI
Canary dextrin 8071; NaAlO₂, 20%

| Expt. | Percent canary dextrin | Mixing | Stability | | |
|---|---|---|---|---|---|
| | | | 20 hours | 2 weeks | 4 weeks |
| 1 | 2.2 | Manual, 5 min | Liquid | Liquid | Liquid. |
| 2 | 2.2 | Blender, 5 min | ___do___ | ___do___ | Do. |
| 3 | 3.7 | ___do___ | ___do___ | ___do___ | Do. |
| 4 | 7.1 | ___do___ | ___do___ | ___do___ | Do. |
| 5 | 2.2 | Manual 60°, 5 min | ___do___ | ___do___ | Do. |
| 6 | 2.2 | Manual 100°, 5 min | ___do___ | ___do___ | Do. |

TABLE VII
Canary dextrin 8071; NaAlO₂; 20%, 11.6%, 6.25%, 3.25%

| Expt. | Percent canary dextrin | Percent NaAlO₂ | Mixing | Stability | | |
|---|---|---|---|---|---|---|
| | | | | 20 hours | 2 weeks | 4 weeks |
| 1 | 2.1 | 11.6 | Manual 100°, 5 min | Slight ppt | Liquid | Liquid. |
| 2 | 2.1 | 6.25 | ___do___ | ___do___ | ___do___ | Do. |
| 3 | 2.1 | 3.25 | ___do___ | ___do___ | ___do___ | Do. |
| 4 | 3.7 | 11.6 | ___do___ | ___do___ | ___do___ | Do. |

NOTE.—The slight precipitates immediately present were filtered off; the clear filtrate remained clear.

TABLE VIII
British gum, 9084; NaAlO₂, 20%

| Expt. | Percent British gum | Mixing | Stability | | |
|---|---|---|---|---|---|
| | | | 20 hours | 2 weeks | 4 weeks |
| 1 | .74 | Blender, 5 min | Liquid | Liquid | Liquid. |
| 2 | 2.2 | ___do___ | ___do___ | ___do___ | Do. |
| 3 | 3.7 | ___do___ | ___do___ | ___do___ | Do. |
| 4 | 2.2 | Manual, 5 min | ___do___ | ___do___ | Do. |
| 5 | 2.2 | Manual 60°, 5 min | ___do___ | ___do___ | Do. |
| 6 | 2.2 | Manual 100°, 5 min | ___do___ | ___do___ | Do. |

The above tables show various solutions which were found to be stable in most instances. Stability of the sodium aluminate-starch solution in modified form is probably related to two properties of the particular starch—its water solubility and the method used to achieve its water solubility. Experiments proved that solubility alone is not the criterion since starch, for example plain corn starch, Buffalo 3401 (Corn Products) and Superlose (Stein-Hall), which are soluble, do not give stable solutions with sodium aluminate. The addition of starch results in the formation of compounds of the type

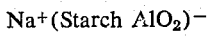

Na⁺(Starch AlO₂)⁻

This would lead to stable solutions by analogy to the stabilizing effect of the polyhydroxyl compounds on other insoluble oxides and hydroxides, for example, boric acid in glycerine and boric acid in guar gums.

The shape of the starch molecule would be a most important factor here. A ball shaped molecule which enclosed the aluminate ion would effectively protect the aluminate ion from the hydrolyzing action of water and the neutralizing effect of other aluminum hydroxide ions. The acid hydrolyzed starches seem to do this best. Another factor would be the tendency of the modified starch molecule to unite with the negatively charged aluminate ion to form the complex ion. With aluminum sulfate, i.e., alum, where the hydrated aluminum ion is positive, there is no tendency of the same modified starches to form stable complex ions. This might follow from the following consideration. In the formation of the complex with other ions it is assumed that the hydrogen bond is used through the hydroxyl group. This could be done to other oxygen atoms, i.e., (—C—O—H . . . OAlO). In the hydration of the aluminum ion of alum by water, the oxygen of the water is used, leaving no oxygen atom to take part in the hydrogen bond formation.

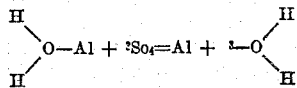

This would explain the instability of alum solutions with the same modified starches which gave stable solutions in sodium aluminate. Sodium hydroxide probably solubilizes the starch by similar formation of complex ions of starch and hydroxyl ions. The discussion here is necessarily preliminary, but it does suggest that compounds which complex with aluminum positive ions leaving free oxygen atoms exposed and susceptible to hydrogen bond formation, would stabilize the starch-alum solution.

Hydrophilic Colloids—Starches

In connection with the test data which follows, it will be seen that the flocculent precipitates were achieved with substantially reduced quantities of alum, i.e., aluminum sulfate, and there must be some explanation or theory as to why these results were obtained. This action did appear different, and the gelatinous precipitate of aluminum hydroxide, produced from the hydrolysis of aluminum salts, tends to absorb foreign particles from the water solution in which it is formed, and on settling drags these particles down with it. The larger the individual aggregate of aluminum hydroxide, i.e., the larger the aluminum hydroxide particle, the more rapid is the settling, and the tougher the flocculent precipitate. The action of the starch here is seen as one of a starch molecule tying itself to several aluminum hydroxide particles and more rapidly forming a large gelatinous insoluble aggregate which settles faster. By serving as a large nucleus to which several aluminum hydroxide molecules can attach readily, it facilitates the combination of aluminum hydroxide individual molecules into the floc size particles. In this manner it acts as a contact catalyst, perhaps. A second function of the starch molecule undoubtedly is to serve as a polar adsorber for foreign particles in solution, especially those which may be charged. The aluminum hydroxide starch combination undoubtedly assumes the charge of the aluminum hydroxide particle, giving a new charged molecule of much larger size and, therefore, more easily contacted by other charged particles in the solution. This leads me to suggest that the role of the sodium aluminate in promoting and aiding floc formation is to give charged gel aggregates initially opposite in charge from those produced by the alum. These oppositely charged aggregates would act in two ways, first, to adsorb oppositely charged foreign particles and, secondly, to combine with the first formed aluminum hydroxide plus starch from the alum hydrolysis to give still larger gel aggregates.

Still a third function of the starch could be to keep small aluminum hydroxide aggregates in solution and give them a chance to form the larger aggregates before precipitating. It is known, of course, that the aluminum hydroxide is prevented from precipitating by the presence in the solution of organic compounds containing hydroxyl groups, the so-called stabilizing effect. This prevents the rapid formation and precipitation of many very fine alumina aggregates which while having high adsorbing power, would settle slowly and give soft flocs which could easily be stirred up again. This would counteract the purpose of the floc, that of shagging out foreign impurities and keeping them out.

The further action of the large starch molecule would be to serve as an adsorbent for material which are not charged but still get trapped physically or due to the polarity of the hydroxyl groups on the starch molecule. In quantitative analysis and in chemical production, so-called filter aids are used, frequently paper pulp which physically traps and drags down gelatinous precipitates of various kinds.

One could hypothesize as to the nature of this action, the charge center of branch chain molecules versus long chain molecules, but it is hard to state the exact action of these materials. This statement is provided by way of background in order to attempt an explanation for the results achieved, but it should be said that this theory of action is not in itself entirely correct. It is only suggestive of the mechanism taught in this invention.

Though it is known in general that various hydrocolloids may be precipitated from aqueous solutions by electrolytes (see in this connection "Natural Plant Hydrocolloids," page 54; published September 1954 by American Chemical Society), generalizations as to the reactions of hydrophilic and hydrophobic colloids and electrolytes are difficult. A great number of hydrocolloids have been checked with a great number of electrolytes. In general, it may be said that polyelectrolytes, for example the polysaccharides and starches, are the more sensitive the smaller their equivalent weight. This is contrary to the behavior of hydrophobic colloids. Even macromolecules carrying no ionized groups, such as those of Locust Bean Gum, are coagulated by small amounts of certain electrolytes. A sort of complex formation has been postulated, for example, small additions of borax to Locust Bean Gum solutions bring about gelification. Here the formation of complexes depends on the presence of characteristic configurations of the hydroxyl groups in the polysaccharide. Adjacent hydroxyl groups in cis-position easily form borate complexes. If one borate anion coordinates with four hydroxyl groups of two chain molecules, a di-diol complex is formed which cross links these two macromolecules. This reaction, therefore, leads to the formation of a three-dimensional network which manifests itself as gelification. These complexes are formed only in an alkaline medium, but too much alkali may destroy the complex. It is, therefore, to be noted that there may be some relationship between the formation of the above complexes and the complexes taught in this invention.

In general in the results which follow from the stabilization of the sodium aluminate-starch solutions and from the flocculation data, it will be seen that the specific starches found to give the best results were Amidex 411, 511 and 611, White and Canary dextrins and British gum. Except for a very few of the starches, some improved result was noted in the use of these starches when used in combination with sodium aluminate to the alum treatment of turbid waters. These produced more stable flax faster, resulting in comparable clarification and using less alum than previously considered necessary. Soluble starches of the class of starches modified by acid treatment are considered best suited for this combination because they give stable solutions and moderate concentrations in the presence of a high concentration of sodium aluminate.

There is a problem in connection with these starches and other natural occurring gums and hydrophilic colloids with respect to fluidity, and in the three frequently used materials, Amidex 411, 511 and 611, the fluidity decreased when the higher numbered Amidex was used. Since the high concentration starch solutions are viscous, which is particularly true of some of the natural occurring gums, it is better to use the more fluid low concentration solutions because of their adaptability to metering equipment used in municipal water plants.

As flocculent improvers or coagulant aids, it was found that there is a critical range of concentrations, in which the starch-sodium aluminate solutions are most effective when combined with the principal coagulant alum. For a water containing 40 p.p.m. turbidity, 5 p.p.m. of alum and .1 to 10 p.p.m. of a dextrin-sodium aluminate solution gave very good flocculation results. Higher and lower concentrations were not as good with this range of ingredients. Therefore, where this water of 40 p.p.m. turbidity would normally require about 13 p.p.m., the amount of alum was reduced by more than 50 percent, with a very slight addition of dextrin-sodium aluminate solution. Since .1 p.p.m. was almost as effective as 10 p.p.m., it would, of course, be cheaper to use smaller quantities of the coagulant aid.

The requirements of alum and additive do not go down proportionately for water of lower turbidities, i.e., 10 p.p.m. At higher turbidities, i.e., 100 p.p.m., the additive continues to exert an increased beneficial effect. In fact, it seems likely the additives will find its greatest application in the water containing the higher turbidities.

By way of example, the starches known as the Amidexes gave cloudy emulsions, not true solutions. The dextrins and gums gave clear brown solutions. If any of the materials could be said to be preferred, it might well be the Canary dextrin and sodium aluminate, with 10 percent, more or less, of excess sodium hydroxide.

In a particular example, a small quantity of a combined material having 3 percent Canary dextrin and 21 percent sodium aluminate reduced water of 40 p.p.m. to a clear liquid, using only 5 p.p.m. of alum, where otherwise 13 p.p.m. of alum would have been necessary to clarify the water. The results achieved were a satisfactory floc and satisfactory clarification of the water.

In this connection, only .4 p.p.m. of this material was required. By a quick calculation it can be seen that there was a savings of 7.65 p.p.m. of alum, or 64 pounds per million gallons. With a material used as a coagulant aid, which might cost $5.00–$7.00 but taking a $6.00 figure for this purpose, it will be seen that a small quantity, perhaps as low as ¾ of a pint at a cost of somewhat less than 60¢, would result in a savings of more than $1.44, or a net savings after the expenditure for the coagulant aid of about 88¢ per million gallons. It will be noted that this is a proportional savings of about 37–40 percent of the alum cost. This alum, it is assumed, costs about $2.25 per 100 pounds.

At this point it would be best to review the results achieved in connection with the stable solutions of the hydrophilic colloids and starches. With respect to Amidex 411, solutions from 1 percent to 13 percent were used with 20 percent sodium aluminate and were found to be stable. However, at the higher ranges, they were quite viscous. With Amidex 511, 2.2–7.1 percent solutions were used with 20 percent sodium aluminate and found to be stable. With Amidex 611, 1.5–13 percent solutions with 20 percent sodium aluminate were found to be stable, and as high as 16 percent actually was solid. The higher percentage ranges, i.e., from 7 to 13, were slightly viscous to very viscous. It will be noted from the data shown herein that beyond about 10 percent of any of the three Amidex solutions, the material will be so viscous that handling problems may be involved. Solutions of white dextrin 7062, ranging from 2.2–42 percent in concentration with 20 percent sodium aluminate by weight added were used and found to be stable, though the higher ranges were very viscous. With a lower concentration of sodium aluminate, i.e., 11.6 percent, 17 percent was viscous after four weeks.

With Canary dextrin 2.2–7 percent solutions were stable using 20 percent sodium aluminate. With lower concentrations of sodium aluminate, i.e., 11.6, 6.2 and 3.2 percent, respectively, varying amounts of Canary dextrin, i.e., from 2–3.7 were stable. Other solutions were checked, although not reported, but it is believed that 1–50 percent of Canary dextrin solutions are stable. All lower concentrations of Canary dextrin with varying quantities of sodium aluminate were found to be stable. Care should be taken that very dilute solutions of sodium aluminate, i.e., below 3.2, do not form an aluminum hydroxide precipitate.

With British gum .74–3.7 percent solutions with 20 percent sodium aluminate were stable, but 15 percent British gum would be useable.

The following materials were found to be unsatisfactory because they are either unstable or excessively viscous:

3 percent Buffalo starch with 20 percent sodium aluminate solution
3 percent Eagle starch with 20 percent sodium aluminate solution
3 percent 761 Starch with 20 percent sodium aluminate solution
3 percent B918 starch with 20 percent sodium aluminate solution
.5 percent Guar with 20 percent sodium aluminate solution It is believed that solutions up to 40 percent British gum with 20 percent sodium aluminate solution would be stable. The standard here is one of stability and viscosity, i.e., a too viscous solution would be impractical to use.

The following flocculation tables should be noted in connection with this invention:

TABLE I

Solutions:
(1) NaAlO$_2$, 10%; white dextrin, 15%
(2) NaAlO$_2$, 10%; white dextrin, 18%
(3) Jaguar A–20–A, 0.9%; CMC, 0.5% (carboxymethyl cellulose)
(4) Guartec F, 3 g.; conc. HCl, 10 ml.; H$_2$O, 40 ml.; NaOH, 5 g.
(5) NaAlO$_2$, 10%; Buffalo starch 3401, 4.5%
(6) Amidex 611, 15%; NaAlO$_2$, 10%

Samples 3 and 4 were run without NaAlO$_2$ and were not effective. NaAlO$_2$ solution was then added to give the equivalent of having a 20% solution of it with the starch.

Turbidity, 40 p.p.m.; temperature, 12° C.

| Solution | Concentration, cc./liter | P.p.m. | Alum, gr./gal. | P.p.m. | Flocculation |
|---|---|---|---|---|---|
| (1) | .002 | 2 | .5 | 8.6 | Good. |
| (2) | .002 | 2 | .5 | 8.6 | Do. |
| (3) | .002 | 2 | .5 | 8.6 | Poor. |
| (4) | .002 | 2 | .5 | 8.6 | Fair. |
| (5) | .002 | 2 | .5 | 8.6 | Good. |
| (6) | .002 | 2 | .5 | 8.6 | Very good. |

Temperature 12° and 10° C.

| (1) | .001, .0001 | 1, .1 | .3 | 5.1 | Good. |
| (2) | .001, .0001 | 1, .1 | .3 | 5.1 | Do. |
| (5) | .001, .0001 | 1, .1 | .3 | 5.1 | Do. |
| (6) | .001, .0001 | 1, .1 | .3 | 5.1 | Do. |

| Solution | Concentration, cc./liter | P.p.m. | Alum, gr./gal. | P.p.m. | NaAlO$_2$ added 20% soln. | P.p.m. | Flocculation |
|---|---|---|---|---|---|---|---|
| (3) | .0001 | .1 | .3 | 5.1 | .0001 | .1 | Good. |
| (4) | .0001 | .1 | .3 | 5.1 | .0001 | .1 | Do. |

* * * * * * * * *

| Solution | Concentration, cc./liter | P.p.m. | Alum, gr./gal. | P.p.m. | Turbidity, p.p.m. | NaAlO$_2$ added, cc./liter | P.p.m. | Flocculation |
|---|---|---|---|---|---|---|---|---|
| (1) | .0001 | .1 | .3, .5 | 5, 8.6 | 2.5 | | | Very good. |
| (2) | .0001 | .1 | .3, .5 | 5, 8.6 | 2.5 | | | Do. |
| (3) | .0001 | .1 | .3, .5 | 5, 8.6 | 2.5 | .0001 | .1 | Do. |
| (4) | .0001 | .1 | .3, .5 | 5, 8.6 | 2.5 | .0001 | .1 | Do. |
| (5) | .0001 | .1 | .3, .5 | 5, 8.6 | 2.5 | | | Do. |
| (6) | .0001 | .1 | .3, .5 | 5, 8.6 | 2.5 | | | Do. |

TABLE II

Solutions:
(1) British gum, 27%; NaAlO$_2$, 5.7%
(2) Canary dextrin, 27%; NaAlO$_2$, 5.7%
(3) White dextrin, 25%; NaAlO$_2$, 8.8%
(4) British gum, 3.6%; NaAlO$_2$, 20%
(5) Canary dextrin, 3.6%; NaAlO$_2$, 20%
(6) Canary dextrin, 7.2%; NaAlO$_2$, 19%
(7) White dextrin, 7.2%; NaAlO$_2$, 19%
(8) Canary dextrin, 2.3%; NaAlO$_2$, 15%

| Solution | Concentration, cc./liter | P.p.m. | Alum, gr./gal. | P.p.m. | Turbidity, p.p.m. | Temperature, ° C. | Flocculation |
|---|---|---|---|---|---|---|---|
| (1) | .0001 | .1 | 0.3 | 5 | 40 | 10 | Good. |
| (2) | .0001 | .1 | 0.3 | 5 | 40 | 10 | Very, very good. |
| (3) | .0001 | .1 | 0.3 | 5 | 40 | 10 | Do. |
| (4) | .0001 | .1 | 0.3 | 5 | 40 | 10 | Do. |
| (5) | .0001 | .1 | 0.3 | 5 | 40 | 10 | Do. |
| (6) | .0001 | .1 | 0.3 | 5 | 40 | 10 | Do. |
| (7) | .0001 | .1 | 0.3 | 5 | 40 | 10 | Do. |
| (8) | .0001 | .1 | 0.3 | 5 | 40 | 10 | Do. |
| Blank | 0 | | 0.3 | 5 | 40 | 12–14 | Poor. |
| Do | 0 | | 0.6 | 10 | 40 | 12–14 | Do. |
| Do | 0 | | .75 | 12.5 | 40 | 12–14 | Good. |

TABLE III

Solutions:
(1) Alum—40 ml.; 30% soln.; Canary dextrin, 1.5 g.; H$_2$O, 7 ml.
(2) Alum—47 ml.; 30% soln.; Amidex 611, 3%.
(3) Alum—48.5 ml.; 30% soln.; Buffalo starch 3401, 1.5 g.; H$_2$O, 20 ml.

| Solution | Concentration, cc./liter | P.p.m. | NaAlO$_2$ (21% soln.), cc. | Turbidity, p.p.m. | Temperature, °C. | Flocculation |
|---|---|---|---|---|---|---|
| (1) | .0001 | .1 | .34 | 40 | 10 | Good. |
| (2) | .0001 | .1 | .34 | 40 | 10 | Do. |
| (3) | .0001 | .1 | .34 | 40 | 10 | Do. |

TABLE IV

Solution No. 5 from Table II: Canary dextrin, 3.6%; NaAlO$_2$, 20%

Turbidity 40

| Alum soln., p.p.m. | 0 p.p.m. | 100 p.p.m. | 10 p.p.m. | 1 p.p.m. | .1 p.p.m. | .01 p.p.m. |
|---|---|---|---|---|---|---|
| 1.7 | | Fair | Very poor | Fair | Very poor | Very poor. |
| 3.4 | | do | Good | Good | Poor | Poor. |
| 5.1 | | Very good | Very, very good. | Very good | Very, very good. | Do. |
| 6.8 | | Very, very good. | Excellent | Excellent | Excellent | Very good. |
| 8.5 | | Excellent | do | do | do | Excellent. |
| 10.2 | Poor | do | do | do | do | Do. |
| 11.9 | | Excellent (+) | do | do | do | Do. |
| 13.6 | Good | do | do | do | do | Do. |
| 15.3 | | do | do | do | do | Do. |
| 17.1 | | Excellent (±) | do | do | do | Do. |
| 18.7 | | do | do | do | do | Do. |
| 25.7 | | do | do | do | do | Do. |

Turbidity 100

| | | | | | | |
|---|---|---|---|---|---|---|
| 5.1 | | | | | Poor (+) | No good |
| 8.5 | | | | | Fair | Very poor |
| 11.9 | | | | | Very good | Fair |
| 13.6 | | | | | Excellent | Good |
| 15.3 | Fair | | | | Very good | Very good |
| 17.1 | | | | | No good | |

TABLE V

Canary dextrin 8071; NaAlO$_2$; 20%, 11.6%, 6.25%, 3.25%
Concentration: .0001 cc./liter (.1 p.p.m.)
Alum: 0.3 gr./gal. (5.1 p.p.m.)

| Solution | Percent canary dextrin | Percent NaAlO$_2$ | Mixing | Flocculation |
|---|---|---|---|---|
| (1) | 2.1 | 11.6 | Manual, 5 min. 100° | Very good. |
| (2) | 2.1 | 6.25 | do | Do. |
| (3) | 2.1 | 3.25 | do | Do. |
| (4) | 3.7 | 11.6 | do | Do. |

*Flocculation Data*

Table I of the flocculation tables shows in general a test with water at 12° C. with the turbidity of the water being 40 p.p.m. When using 2 p.p.m. of the six different solutions shown in Table I, I was able to get a good flocculation, except for 3 and 4. When reducing the concentration to 1 part or .1 of a part, I was still able to get good results using 5.1 p.p.m. of alum. After adding aluminate to solutions 3 and 4, which were Guar solutions, I was able to get results at .1 p.p.m. Notice how the results were generally good or very good in spite of the decreased concentration of the coagulant aid, whether White dextrin or the various Amidexes. This indicates that the solution itself produced a new and unusual result and at lower concentrations than previously thought feasible.

Table II shows various materials including the British gums and several of the dextrins at various concentrations of aluminate. Notice how .1 p.p.m. with 5 p.p.m. of alum reduced the turbidity of the water very decidedly and how I had to increase the concentration of alum from 5 to 10 or 12½ when no coagulant aid was added in order to get a good result. That is to say, it took 2½ times as much alum to produce the same result without the coagulant aid of the hydrophilic colloid, such as British gum, dextrins or the like, and the aluminate.

Table III shows that .1 p.p.m. of an alum-dextrin solution or equivalent materials when added to water being coagulated with sodium aluminate produced good flocculation results.

Table IV is a broad table showing the use of a certain solution, Canary dextrin-sodium aluminate, with the varying concentrations of the solution from .1–.00001 cc. per liter, i.e., from more than 100 to .01 p.p.m. of the coagulant aid when added with alum in the proportion of 1.7 p.p.m. to as much as 25, and it will be noted that 1 p.p.m. of coagulant aid and 3.4 p.p.m. of alum produced a good result. Ten times this much coagulant aid still produced the same result. It is obvious that minimal quantities of the coagulant aid is used. With slightly more alum, i.e., 5.1 p.p.m. only .1 p.p.m. of coagulant aid was required, and with 6.8 p.p.m. of alum only .01 p.p.m. was needed. Comparable comments could be made in connection with this table, particularly the lower portion, with regard to materials and the turbidity of 100 p.p.m. Figuring out the proportion of ingredients of the coagulant aid in these compounds, it will be seen that anywhere from .00005 to 2 p.p.m. of the hydrophilic colloid, particularly the acid hydrolyzed starches, such as white dextrin, canary dextrin, British gum and mixtures thereof, may be used and also used with an alkaline coagulant in the range .00005 to 3 p.p.m. by weight of either sodium aluminate, potassium aluminate or mixtures thereof, and an effective quantity of a coagulating agent may be added. It is realized, of course, that this coagulant aid has a coagulating action. Since minimal quantities of the coagulant aid would be cheaper, I would prefer to operate in the range in which the colloid is .005 to .4 p.p.m. by weight and in which the alkaline coagulating agent is .005 to .3 p.p.m. by weight. This is a range within the earlier range specified.

Table V shows that Canary dextrin in varying percentages is used in the proportion of .1 p.p.m. as coagulant aid, i.e., the Canary dextrin-aluminate solution, and about 5 p.p.m. of alum. It was found that very good flocculation results were obtained with varying concentrations of aluminate in the proportions set forth. This test indicates that the concentration of the aluminate is not necessarily critical in this combination.

The preferred treatment would be to mix the stream of aluminate with the starch before metering into the waters to be treated. The alum should not be mixed with the other components before being added to the water. The stream of colloid and aluminate must be added either before or after the alum stream. One must be thoroughly dispersed in the water before the other is added.

The conclusion which I draw from the above is that a liquid solution which is stable under all conditions has been found that will substantially reduce the quantity of a coagulant, such as alum, needed for the clarification of water. Also, a coagulant aid of the type used in this invention is entirely feasible economically and productive of improved results and a flocculent aid. This new result is a process for treating water comprising a hydrophilic colloid combined with a sodium aluminate or equivalent material, i.e., if the stability of the solution is not required in connection with municipal plants, and the separate streams are employed, the other hydrophilic colloids may be used in the process with sodium aluminate and the desired quantity of alum. Substantial savings in alum also may be achieved in connection with this process.

Although the present invention has been described in connection with a few preferred embodiments thereof, variations and modifications may be resorted to by those skilled in the art without departing from the principles of the invention. All of these modifications and variations are considered to be within the true spirit and scope of the present invention as disclosed in the foregoing description and defined by the appended claims.

I claim:
1. A stabilized concentrate of coagulating aid for water coagulants comprising an aqueous solution containing about 1 to 50 percent by weight of at least one hydrophillic colloid selected from the group consisting of acid-hydrolized starches, gums and dextrins; about 1 to 30 percent by weight of at least one alkali metal aluminate; and about 6 to 50 percent by weight of the aluminate of at least one alkali metal hydroxide.

2. The stable concentrate of claim 1 further characterized in that the alkali metal aluminate consists of a mixture of sodium and potassium aluminate.

3. The stable concentrate of claim 1 further characterized in that the alkali metal aluminate is sodium aluminate and the alkali metal hydroxide is sodium hydroxide.

4. The stable concentrate of claim 1 further characterized in that the water coagulant is selected from the group consisting of aluminum sulfate, ferric sulfate, aluminum ammonium sulfate, aluminum potassium sulfate, ferric chloride, and aluminum chloride.

5. A stabilized concentrate of coagulating-aid for an aluminum sulfate coagulant consisting essentially of an aqueous solution containing 3 to 17 percent by weight of at least one hydrophillic colloid selected from the group consisting of acid-hydrolyzed starches, gums, and dextrins; about 5 to 30 percent by weight of at least one alkali metal aluminate; and about 6 to 50 percent by weight of the aluminate of at least one alkali metal hydroxide.

References Cited in the file of this patent

UNITED STATES PATENTS

| | | |
|---|---|---|
| 2,351,259 | Fuetterer | June 13, 1944 |
| 2,728,725 | Gloor | Dec. 27, 1955 |

FOREIGN PATENTS

| | | |
|---|---|---|
| 124,192 | Australia | May 5, 1947 |
| 490,236 | Canada | Feb. 3, 1953 |